Figure 7:
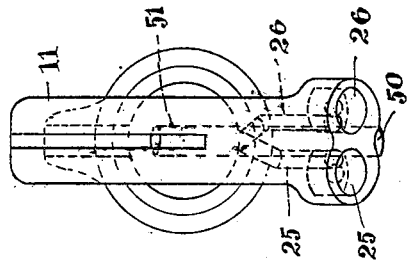

No. 838,363. PATENTED DEC. 11, 1906.
H. B. STOCKS.
POWER HAMMER.
APPLICATION FILED AUG. 31, 1905.
7 SHEETS—SHEET 1.
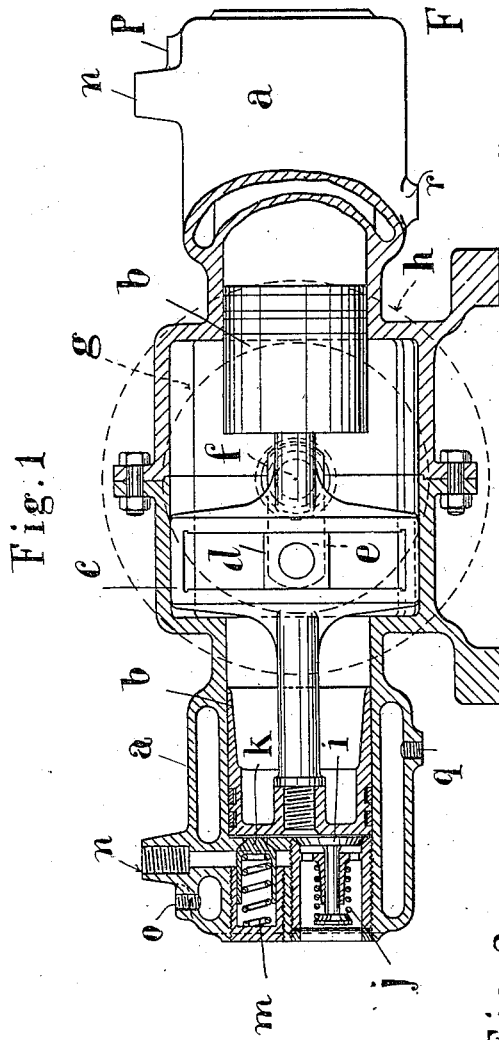
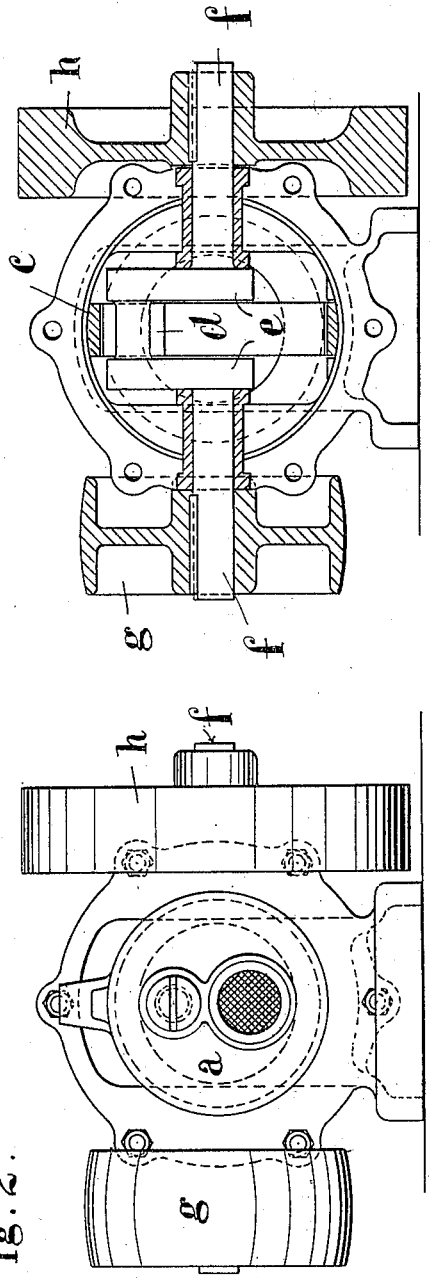
Witnesses
Inventor
Harry Benwell Stocks
By his attys

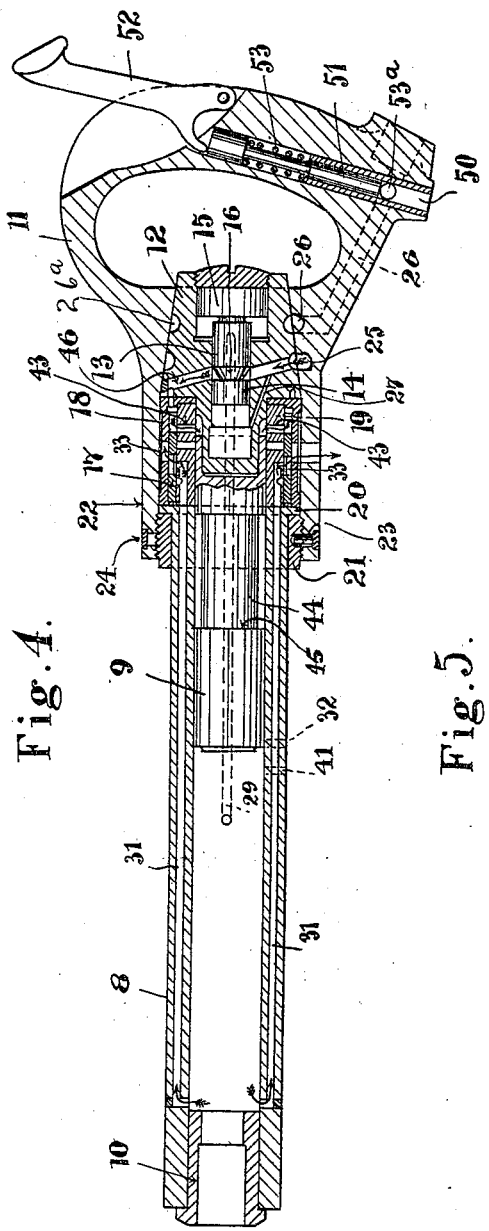
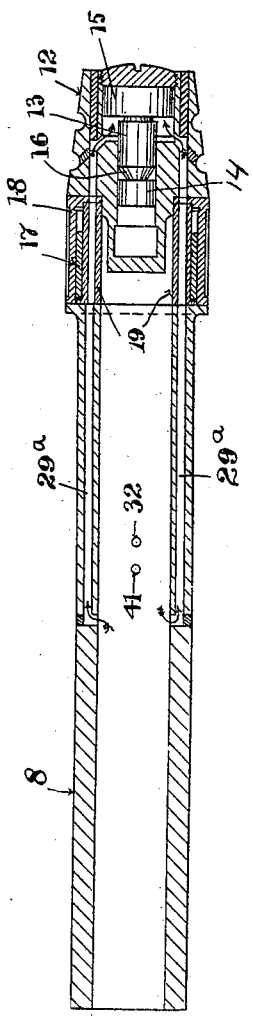

No. 838,363.
PATENTED DEC. 11, 1906.
H. B. STOCKS.
POWER HAMMER.
APPLICATION FILED AUG. 31, 1905.

7 SHEETS—SHEET 3.

Witnesses
Inventor
Harry Benwell Stocks
By his atty Richardson

THE NORRIS PETERS CO., WASHINGTON, D. C.

No. 838,363. PATENTED DEC. 11, 1906.
H. B. STOCKS.
POWER HAMMER.
APPLICATION FILED AUG. 31, 1905.
7 SHEETS—SHEET 4.
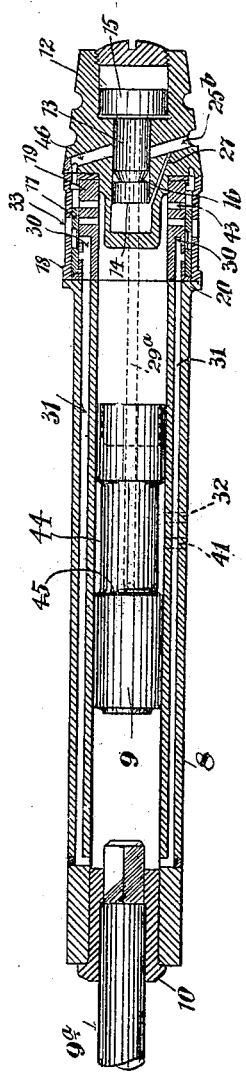
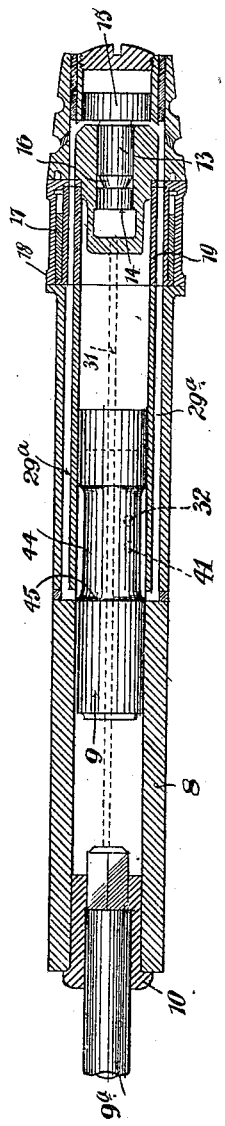
Witnesses
H. N. Siericks
W. P. Burke
Inventor
Harry Benwell Stocks
By his atty Richardson

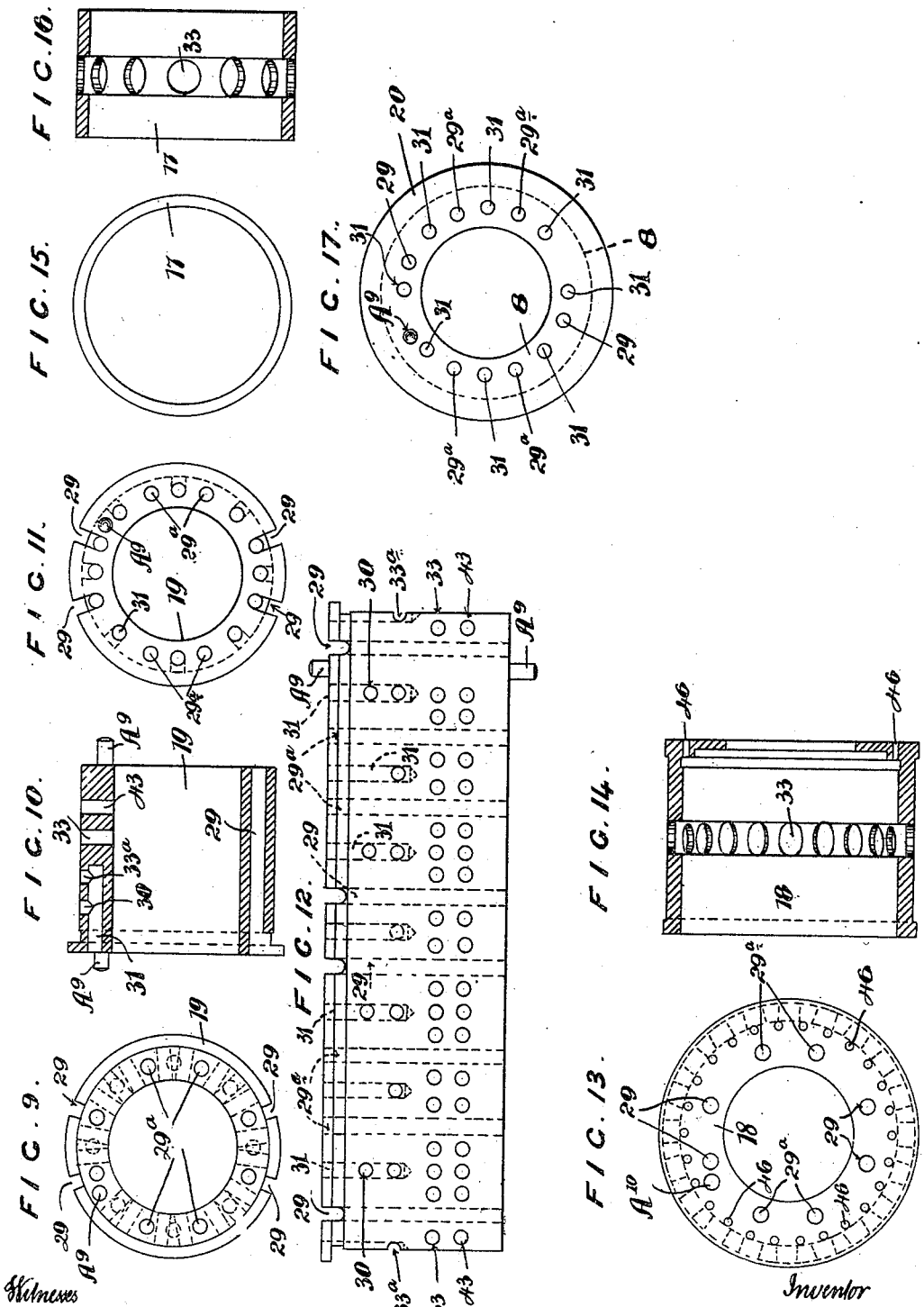

No. 838,363. PATENTED DEC. 11, 1906.
H. B. STOCKS.
POWER HAMMER.
APPLICATION FILED AUG. 31, 1905.
7 SHEETS—SHEET 6.
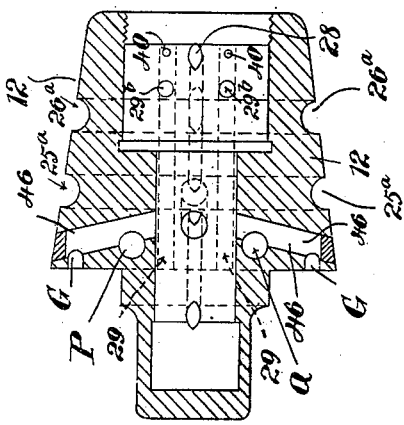
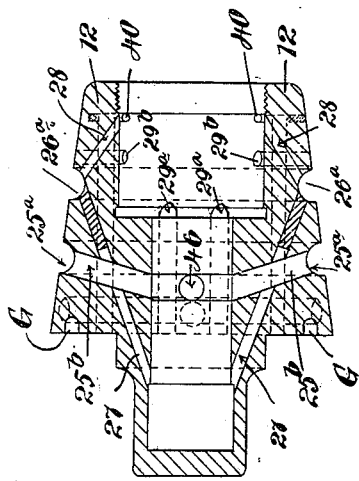
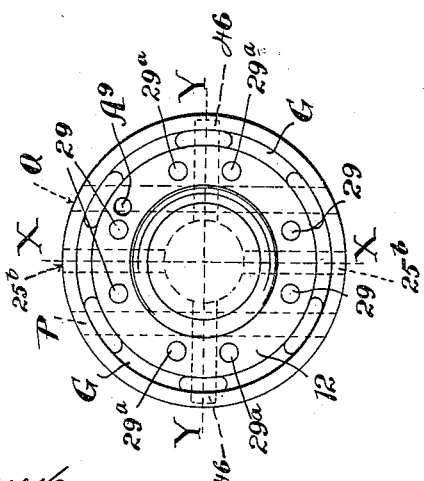
Witnesses
W. P. Burke
John A. Percival
Inventor
Harry Benwell Stocks
By his attys Richardson No. 838,363. PATENTED DEC. 11, 1906.
H. B. STOCKS.
POWER HAMMER.
APPLICATION FILED AUG. 31, 1905.
7 SHEETS—SHEET 7.
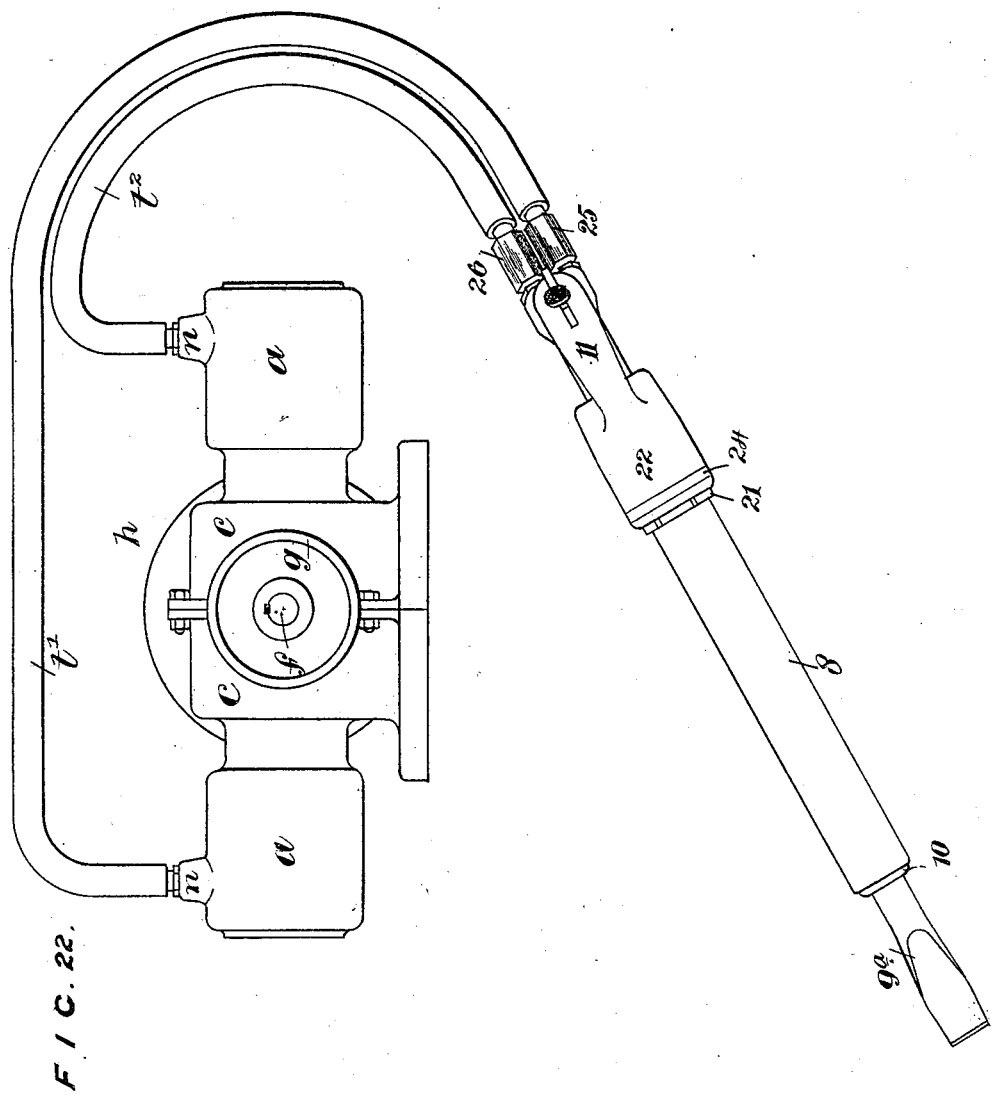

UNITED STATES PATENT OFFICE.

HARRY BENWELL STOCKS, OF MANCHESTER, ENGLAND, ASSIGNOR TO THE CLIMAX PATENTS LIMITED, OF MANCHESTER, ENGLAND.

POWER-HAMMER.

No. 838,363.       Specification of Letters Patent.       Patented Dec. 11, 1906.

Application filed August 31, 1905. Serial No. 276,600.

*To all whom it may concern:*

Be it known that I, HARRY BENWELL STOCKS, engineer, a subject of the King of Great Britain, residing at "Stanton," 124 Barlow Moor road, Charlton-cum-Hardy, Manchester, in the county of Lancaster, England, have invented new and useful Improvements in Power-Hammers and in Means for Operating the Same, of which the following is a specification.

My invention relates to power-hammers and similar percussive tools actuated by pneumatic pressure and to means for operating the same.

In connection with each power-hammer I use a separate air-compressor, and as a novel feature therein I provide means whereby the pressure obtained at each impulse of the compressor is built up within two tubes, conducting air under different pressures to the tool until predetermined pressures are attained within such tubes. On the pressures being exceeded in the tubes an air-loaded differential valve in the tool is actuated to conduct the air to one side or other of the reciprocating hammer of the tool. The said air-loaded differential valve is of such proportions, depending on the pressures used, that under the normal action of the air-pressures acting thereon it will be held in equilibrium; but should the normal ratio of pressures be disturbed by an impulse from the air-compressor the differential valve is actuated to admit the compressed air to the tool. It will thus be understood that a reciprocating motion will be given to the said differential valve by the rise and fall of pressures above and below a normal value, which depends on the quantity of air discharged from the compressor compared with the quantity of air taken by the hammer.

When the two pressures have reached their working normal value, the volume of air under pressure discharged from the compressor at each stroke will be equal to the volume of air under pressure absorbed at each stroke of the hammer. These normal working pressures will henceforth be referred to as the "predetermined" pressures.

I also arrange that a far greater pressure shall be delivered behind the piston on its outward or working stroke than on the return or idle stroke, as will be explained in the course of the following description, and in order that my invention may be fully understood I will now proceed to describe it in detail with the aid of the accompanying drawings, to which I will refer.

Figure 6:
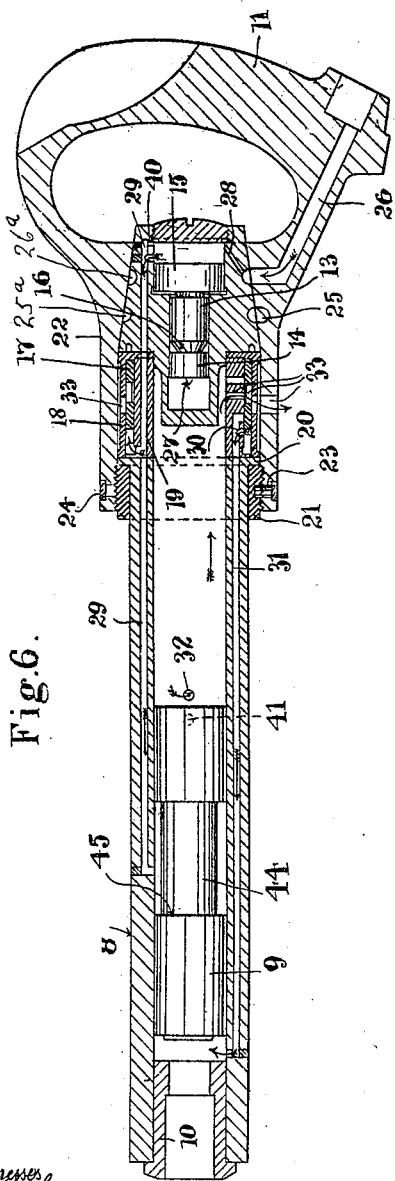

Figure 1 of the drawings illustrates, on a small scale, a sectional side elevation of the air-compressor used under my invention. Fig. 2 is an end elevation thereof. Fig. 3 is a cross-section. Fig. 4 is a power-hammer constructed as a portable hand-tool, shown on a small scale, made in accordance with my invention, and shown in sectional side elevation. Fig. 5 is a sectional plan of part thereof. Fig. 6 is also a sectional side elevation in which all the parts save the handle have been rotated a quarter-turn to better illustrate the ports which will be referred to in connection with this figure. Fig. 7 is an end view of Fig. 6. Fig. 8 shows a sectional elevation of the tool with handle removed and the position of piston and valves at the point of cut-off. Fig. $8^a$ is a section similar to Fig. 8, but taken through the ports $29^a$. Fig. 9 is a face view of one of the parts of the distributing-valve mechanism. Fig. 10 is a section thereof. Fig. 11 is a view of the other face of this part. Fig. 12 is a plan view of this part as it would appear if rolled out flat. Fig. 13 is an end view of another part of the distributing-valve gear. Fig. 14 is a section thereof. Fig. 15 is a face view of the annular distributing-valve. Fig. 16 is a section thereof. Fig. 17 is a face view of the flanged end of the cylinder, showing the various ports. Fig. 18 is a face view of the differential-valve box. Fig. 19 is a sectional elevation thereof on the line X X, Fig. 18. Fig. 20 is a sectional elevation on the line Y Y, Fig. 18. Fig. 21 is a view of the differential-valve box from the opposite end to that shown in Fig. 18. Fig. 22 shows the air-compressor with the two air-conducting tubes connected to the power-hammer.

In the first place I will describe in detail the construction of air-compressor shown in Figs. 1 to 3, although I wish it to be understood that I do not claim such a compressor shown in these figures to be novel *per se.* Such compressor consists of two cylinders $a\ a$ in line, in which work trunk-pistons $b\ b$. All the parts of the compressor at the left hand of Fig. 1 are shown in section, and it will be understood that the internal parts at the right hand, which are shown in the drawings in outside view, are similar and need not be illustrated. The trunk-pistons $b$ $b$ are connected together by a rectangular frame $c$, in which slides a die-block $d$, connected to a crank $e$, which is common to both pistons. On the crank-shaft $f$ is mounted a pulley $g$, by means of which the shaft is revolved by a belt from any suitable source of power, and the shaft also carries a fly-wheel $h$. As will be understood, the rotation of the crank-shaft effects the reciprocation of the trunk-pistons $b$ $b$. In conjunction with such piston $b$ I provide a suction-valve $i$, which is drawn off its seat against the action of a spring $j$ on the forward movement of the piston admitting air to the cylinder. On the return stroke of the piston the suction-valve $i$ is closed, the air is compressed, and finally forces a delivery or non-return valve $k$ off its seat against the action of a spring $m$, the air being delivered through the orifice $n$. Each of the delivery-orifices $n$ $n$ is connected by flexible tubes $t'$ $t^2$ to the power-hammer and arranged to conduct the air thereto in manner to be hereinafter explained. The heat generated by the compressed air may be dissipated by suitable means. The drawings show water-cooling means, the cylinders being water-jacketed with inlet $o$ and outlet $p$, (or vice versa,) the water-jackets of the two cylinders being connected together at $q$ and $r$ by means of a suitable pipe.

The power-hammer may be of any suitable size, and one form is illustrated in Figs. 4 to $8^a$ of the drawings. The cylinder 8 is bored out for the reciprocating piston 9, which on its forward stroke actuates a suitable chisel or tool $9^a$, inserted fluid-tight in the bush 10, as shown in Figs. 8 and $8^a$. In the handle 11 of the tool is inserted a conical valve-box 12, bored out for a slidable cylindrical differential valve 13, formed with two heads 14 15 of unequal area and an annular recess 16. An annular distributing-valve 17 is arranged to slide between an outer shell 18, secured to the conical differential-valve box 12, and a shell 19. The end of the cylinder 8 is formed with a flange 20, bearing against the shells 18 and 19, and a screwed ring 21 jams the parts in position, as shown in the figures. To lock the screwed ring 21, it is provided with a number of holes in its periphery, the boss 22 of the handle 11 being also bored with a number of holes and formed with an annular recess. A stud 23 is passed through one of the holes in the boss of the handle and into a hole in the screwed ring 21, a split ring 24 being then sprung into the recess to hold the stud in position. It must be stated that the ports for air-pressure and exhaust bored within the differential-valve box 12, annular distributing-valve 17, shells 18 and 19, and cylinder 8 are so numerous and disposed in such varying and circuitous positions that it is impossible to show them correctly in Figs. 4 to $8^a$ and if attempted would only confuse the reader. The various parts have therefore been correctly drawn separately in Figs. 9 to 21 and will be referred to hereinafter.

In Figs. 4 to $8^a$ the ports have been shown simplified for the better comprehension of the system of my invention and are therefore more in the nature of diagrams. The two air-tubes $t'$ and $t^2$ are connected one to the high-pressure inlet 25 and the other to the low-pressure inlet 26. The high-pressure air is always in communication by way of a port or ports 27 to the front of the smaller end 14 of the differential valve. (See Fig. 4.) The low-pressure inlet 26 communicates by a port 28 to the rear of the larger end 15 of the differential valve. The differential areas of the differential valve are such as to maintain the said valve in equilibrium if the normal ratio of pressures acting thereon is not disturbed. Thus, suppose the high pressure were eighty pounds to the square inch and the low pressure twenty pounds, the area of the larger or low pressure end 15 of the differential valve with relation to the area of the smaller or high-pressure end 15 would be as four to one, as will be understood. The predetermined pressure within the tubes $t'$ $t^2$ may be varied, as desired.

Referring to Fig. 6 and assuming that the compressor has attained the predetermined air-pressure within the tubes and the differential valve 13 is in equilibrium, on the next impulse within the low-pressure tube the increased pressure thus attained has destroyed the equilibrium and forced the differential valve 13 over in the position shown in Fig. 6, allowing air to enter the ports 29 and slide the distributing annular valve 17 in the position shown, the air under low-pressure passing around between the shells 18 and 19 to enter by a port or ports 30 into the port or ports 31, conducting the air in front of the hammer-piston 9. The piston is thus returned to the initial starting-point for a blow-stroke, air of the previous stroke exhausting partly out of the hole 32 and being also swept out by the return movement of the hammer-piston 9 through exhaust-ports 33, formed in the shells 18 and 19, the annular distributing-valve 17, and in the boss of the handle of the tool, as can be traced by the arrows in Fig. 6. A by-pass 40, or more than one such by-pass, is provided in conjunction with the port 29, so that when the piston is at the inner end of its stroke, as in Fig. 4, air may constantly escape from in rear of the low-pressure valve through the by-pass 40 and the port 29 and from the hole 41 to atmosphere to prevent the low-pressure air from exceeding the required pressure. Turning now to Fig. 4, it will be seen that the air of the return stroke can escape to atmosphere through the hole 41, also the ports $29^a$ are open to admit low-pressure air to the front of the low-pressure valve 15. This admission of the low-pressure air to the front of the valve 15 and the impulse of high-pressure air to the front of the high-pressure valve 14 through the inlet 25 and passage or passages 27 suddenly reverses the movement of the differential valve into the position shown in Fig. 4. High-pressure air is thus admitted by port $25^b$, Fig. 19, also by means of the annular recess 16 through the high-pressure port 46 in the differential-valve box 12 behind the annular distributing-valve 17, reversing the movement of this valve and opening the high-pressure port or ports 43, thus conducting the high-pressure air behind the hammer-piston 9, actuating it for the outward or blow stroke. Air under pressure is thus admitted suddenly to the back of the hammer 9, providing for a high initial and sustained velocity of working stroke or blow. It will be seen that the piston 9 is formed with a reduced center portion 44, the reason for which will be now explained. When on its forward or blow stroke, as soon as the front or leading edge of the piston 9 has covered the port $29^a$ air is trapped in front of the valve 15, but when the edge 45 of the piston 9 has passed the opening of the ports $29^a$ to the cylinder 8 these ports, owing to the annular recess provided by the reduced part 44, are placed in communication with the exhaust-holes 41 and 32, thus suddenly allowing the residual low-pressure air trapped in front of the low-pressure valve 15 to exhaust. At the same time a slight fall below normal of the pressure acting on the front end of the valve 14, caused by the rear end of the cylinder 8 absorbing slightly more high-pressure air than the compressor is capable of delivering at the maximum pressure, enables the low-pressure air acting on the back of the valve 15 to move it over against the reduced high-pressure at the front end, thus closing the port 46 to high-pressure air when the hammer-piston 9 has made but a portion— say about half—of its stroke. The position of the piston and valves just after the cut-off is effected is clearly shown in Figs. 8 and $8^a$. The remainder of its stroke is thus effected by the expansion of the air admitted behind the piston 9. By thus working expansively less air is required for a blow-stroke, and by utilizing low-pressure air to return the hammer-piston a comparatively small compressor may be used, resulting in a great economy of horse-power consumed for each compressor.

At the commencement of the blow-stroke the low-pressure air exhausts at first through the hole 41 and is also swept out through the ports 31 to exhaust-ports 33, the direction of high-pressure air and exhaust being clearly shown by the arrows, Fig. 4.

It will be seen from the foregoing description that on every impulse of the low-pressure cylinder of the air-compressor the hammer 9 is returned to its initial starting-point by a pressure of air sufficient to secure the required velocity only of the piston. On the next impulse of the air-compressor, which impulse is directed into the high-pressure air-tube leading to the tool, the hammer 9 is actuated by a sudden admission of high-pressure air to the back of the hammer, providing for a blow-stroke of high velocity. Thus at each impulse of the air-compressor there is obtained the synchronous movement of the piston 9 in one direction or the other.

On starting the compressor air will at once be admitted to the hammer, although the predetermined pressure in the tubes $t'$ $t^2$, conducting the air to the hammer, may not have attained its full predetermined value, and the hammer-piston will be moved to and fro. However, with a few strokes of the compressor the pressure of air in the tubes $t'$ $t^2$ will have attained its full predetermined value, because at any lower pressure the volume of air discharged from the compressor is greater than that absorbed by the hammer.

The ratio of the two values of the two pressures delivered from the compressor is governed by the inverse ratio of the areas of the ends 14 and 15 of the differential valve 13.

The compressor would tend to deliver equal pressures into the two tubes; but as the portion 15 of the differential valve has a larger area exposed to pressure than the opposite end 14 of the said valve it would be held over in a forward position. The piston 9 of the hammer will be brought to the rear end of the cylinder under the above circumstances. Thus air would pass from in rear of the larger end 15 of the differential valve through the passage 29 and out to atmosphere through the hole 41 in the cylinder 8. Thus the pressure in the passage 26 would fall until the succeeding impulse of pressure conducted along passage 25 and acting on the end 14 of the differential valve was great enough to force the said valve 13 rearward. The differential valve would then be in a position to effect the forward stroke of the piston 9, which when moved forward would cover ports 29 and 41, thus preventing any further escape of air from in rear of the end 15 of the differential valve. It will thus be seen that the pressure of air trapped between the rear of the valve 15 and the discharge-valve of the compressor must of necessity be in proportion to the pressure of air acting on the smaller end 14 of the said valve as the area of the front end 14 is to the area of the rear end 15 of the differential valve.

Means are provided whereby the working of the tool may be suspended without stopping the air-compressor, which means are indicated in Fig. 4. The high-pressure inlet 25 and low-pressure inlet 26 each communicate by a passage $53^a$ with an exhaust-outlet 50. When the tool is at work, the passage $53^a$ is closed by a piston-valve 51, depressed by the lever 52, against the action of the spring 53. When in position shown in Fig. 4, the pressure within the high and low pressure tubes escapes through the passage 53$^a$ out of the exhaust-outlet 50 to atmosphere. In starting the tool the passage 53$^a$ is closed by depressing the piston-valve, thus confining the air-pressure within the tubes. The piston-valve 51 slides in a tube entering into the high-pressure inlet 25 and low-pressure inlet 26, the passage 53$^a$ being cut in the tube and communicating with both inlets 25 and 26.

Figs. 4 to 8$^a$ being more in the nature of diagrams, as stated, I have illustrated the differential valve-box 12, the shells 18 and 19, the cylinder end, and the annular distributing-valve 17 separately in Figs 9 to 21 to indicate more clearly the various parts, which are bored or formed in these ports Referring now to these figures, Fig. 9 shows the high-pressure end of the shell 19, Fig. 11 being a view of the other end, and Fig. 10 a section. The ports marked 29$^a$ conduct air from valve-operating ports in cylinder to the front of the head 15 of the sliding differential valve 13. At 29 the low-pressure ports discharge air to the back of the annular distributing-valve 17 that the valve may be moved over by the low pressure. The alinement-pin for bringing all the ports into correct position on the cylinder end and face of the shell 19 is shown at A$^9$. As explained, the shell 19 gives the seating on which the annular distributing exhaust-valve 17 travels, the "through-port" 29, Fig. 10, being equivalent to 29, Fig. 9. The ports 43 are the high-pressure inlet-ports opening to piston on the "blow-stroke" or impulse. The ports marked 33 are the high-pressure exhaust-ports discharging exhaust-air through the holes 33 in the annular distributing exhaust-valve 17, which holes correspond to the holes 33 in the shell 19. The ports 33$^a$ are exhaust low-pressure air-ports, and 30 represents live-air low-pressure inlet-ports communicating with 31, as shown. These high and low pressure ports and passages are repeated as often as is necessary.

At Fig. 12 (showing ports and distributing-valve seat in flat projection) the row of low-pressure inlet-holes 30 shows four acting as inlets, and the holes 33$^a$ show eight acting as exhausts, which is found in practice to be suitable for a hammer having a five-inch stroke. The row of holes 33, Fig. 12, are exhaust high-pressure ports, and the row 43 are high-pressure inlet.

At Figs. 15 and 16 I show in front elevation and section, respectively, two views of the annular distributing-valve 17.

At Figs. 13 and 14 I show the distributing-valve cover or shell 18, inside which and making an air-tight sliding fit works the annular distributing-valve 17, receiving its impulses through holes drilled at 46, Figs. 13 and 14, for the high pressure and through the holes 29 in the shell 19 (and shown in Figs. 9, 10, and 11) and the slotted portion of the collar for the low pressure. The holes 29 and 29$^a$ and the adjusting pin-hole A$^{10}$ are drilled, as shown in Fig. 13, that air may pass through to ports marked equivalently in Fig. 9.

Fig. 17 shows the end of cylinder 8, making air-tight joint to end of shell 18 and also to end of shell 19 simultaneously, and like holes are marked equivalently; but be it noted that the by-pass ports 29 are only two in number in the cylinder, leaving a blank in the cylinder opposite these two holes 29 in the shells 18 and 19.

Fig. 18 is the face view of the differential valve-box 12, showing ports drilled from the face, eight in number, and corresponding, as marked, to ports in Figs. 9, 10, 11, and 12, the pin-hole A$^9$ receiving the adjusting-pin and keeping ports in true register on assembling the various parts.

Fig. 19 is a cross-section on the line X X, Fig. 18, of differential valve-box 12 and shows the same made taper, that it may be fitted air-tight into the handle. Two grooves are turned on the outside thereof, (marked 25$^a$ and 26$^a$, shown also in Figs. 20 and 21,) the high and low pressure air-ports 25 26 drilled in the handle of the tool being brought to such position that they register with said grooves 25$^a$ and 26$^a$. Groove 25$^a$ takes the high-pressure air for blow-stroke and through ports 25$^b$ allows air to enter the hole in which works the stem of the differential valve 13 by smaller holes drilled at an angle, as shown at 27 27, and gives its pressure to the small end of the inlet-valve 13, this being necessary, as the differential valve is worked by the impulse of the compressor, as is understood. On the differential valve 13 receiving an impulse the groove 16 therein comes opposite the ports 25$^b$ and allows air to be discharged from these ports to ports 46, Fig. 20, which is a cross-section on the line Y Y, Fig. 18, ports 46 communicating with the annular groove formed in face of differential valve-box 12 and shown at G, Figs. 18, 19, and 20, and from this annular groove the air passes through the holes marked 46, Figs. 13 and 14, to end of annular distributing-valve 17, pushing it over and uncovering thereby the high-pressure inlet-ports 43 in the shell 18, (see Figs. 9, 10, and 12,) entering behind the piston and doing its work as before explained. The low-pressure air enters to groove 26$^a$ and finds its way to the larger end 15 of differential valve 13 by ports drilled, as shown at 28, and when compressor impulse moves the differential valve 13 the full length of its travel ports 29$^b$ are opened and air passes through to the end of the annular distributing-valve 17, moving it over and uncovering the low-pressure inlet-ports in the valve-seat, passing down to the front of the piston and returning same ready for another blow to be struck.

Ports 29ª (shown in Figs. 18 and 19) bring the air behind the larger head 15 of the differential valve 13, as fully described and explained with reference to equivalent ports 29ª, Figs. 4 to 7.

The small holes (shown at 40) discharging into the ports 29 in Fig. 20 are the by-pass passages referred to as 40 in Fig. 6.

Extra holes are drilled at P and Q, Figs. 20 and 21, to assist in distributing high-pressure air to the annular groove G for the purpose described.

I declare that what I claim is—

1. In power-hammers and like percussive tools, a valve-box, a slidable differential valve within the valve-box, an air-compressor for producing two streams of compressed air, air-tubes for conducting the air under pressure from said air-compressor to the valve-box at each side of the differential valve whereby the said valve is held in equilibrium, a distributing-valve, said tools having ports leading from the valve-box to the distributing-valve whereby the distributing-valve is actuated when the equilibrium of the said differential valve is destroyed to conduct air under pressure from the tubes to one side or other of the hammer of the tool substantially as described.

2. In a power-hammer a valve-box, a differential valve slidable in such valve-box, said valve-box having ports formed therein, an inner and outer shell having ports formed therein, a distributing-valve slidable between such shells, said distributing-valve having ports formed therein, a cylinder formed with ports communicating with said valves, and a hammer or piston slidable within such cylinder substantially as described.

3. A power-hammer consisting of a cylinder, a hammer or piston slidable within such cylinder, means for carrying a tool in the mouth of the cylinder, a handle secured to such cylinder, a valve-box, a slidable valve contained in such valve-box, said handle having ports leading to each end of said slidable valve, air-tubes connected to such ports and an air-compressor whereby on a predetermined pressure of air being obtained within the tubes, and valve-box, the slidable valve is held in equilibrium, an annular distributing-valve, said valve-box having ports governed by the slidable valve for actuating the distributing-valve to conduct air under pressure on one impulse of the air-compressor to the front of the piston of the tool to return the piston to the starting-point, and for permitting the air behind the piston to exhaust, said valve-box also having ports governed by the slidable valve to actuate the annular distributing-valve to conduct air under pressure on the next impulse of the air-compressor to the back of the piston of the tool to effect the blow-stroke, and for permitting air of the previous stroke in front of the piston to exhaust substantially as described.

4. A power-hammer consisting of a cylinder, a hammer or piston slidable within the cylinder, means for carrying a tool in the cylinder end, a handle secured to the cylinder, a valve-box in such handle, a slidable differential valve contained within such valve-box, said slidable differential valve having heads of unequal areas and an annular groove, said handle having ports leading to each head of the slidable differential valve, an air-compressor for producing two streams of compressed air, air-tubes for conducting the air under pressures from the air-compressor to the ports in the handle, whereby, on a predetermined ratio of pressures being obtained within the tubes and the valve-box, the slidable differential valve is held in equilibrium, rings or shells arranged between the cylinder end and the valve-box, an annular distributing-valve arranged to slide between such shells, the said valve-box and shells having ports governed by the slidable differential valve to actuate the annular distributing-valve in one direction when the equilibrium of the differential valve is destroyed on one impulse of the air-compressor, said shells, valve-box, annular valve and cylinder having ports governed by the annular distributing-valve when said distributing-valve is actuated in said direction whereby air under low pressure is conducted to the front of the piston of the tool to return the piston to its starting-point and the air behind the piston is permitted to exhaust, the said valve-box and shells also having ports governed by the differential valve to actuate the annular distribution-valve in the reverse direction when the equilibrium of the differential valve is destroyed by the next impulse of the air-compressor, said shells, valve-box, annular distributing-valve, and cylinder also having ports governed by the annular distributing-valve when actuated in said reverse direction whereby air under high pressure is conducted to the back of the piston of the tool to effect the blow-stroke, and the air in front of the piston is permitted to exhaust, substantially as described.

5. A power-hammer consisting of a cylinder, a hammer or piston slidable within the cylinder, means for carrying a tool in the cylinder end, a handle secured to the cylinder, a valve-box in such handle, a slidable differential valve contained within such valve-box, said differential valve having heads of unequal areas and an annular groove, said handle having ports leading to each head of the differential valve, an air-compressor for producing two streams of compressed air, air-tubes for conducting the air under pressure from the air-compressor to the ports in the handle, whereby, on a predetermined ratio of pressures being obtained within the tubes and valve-box the differential valve is held in equilibrium, rings or shells arranged between the cylinder end and the valve-box, an annular distributing-valve arranged to slide between such shells said valve-box and shells having ports governed by the differential valve to actuate the annular distributing-valve in one direction when the equilibrium of the differential valve is destroyed on one impulse of the air-compressor, said shells, valve-box distributing-valve and cylinder having ports governed by the distributing-valve when said distributing-valve is actuated in said direction whereby air under low pressure is conducted to the front of the piston of the tool to return the piston to its starting-point and the air behind the piston is permitted to exhaust said valve-box and shells also having ports governed by the differential valve to actuate the distribution-valve in the reverse direction when the equilibrium of the differential valve is destroyed by the next impulses of the air-compressor, said shells valve-box, distributing-valve and cylinder also having ports governed by the distribution-valve when actuated in the reverse direction whereby air under high pressure is conducted to the back of the piston of the tool to effect the blow-stroke and air in front of the piston is permitted to exhaust, said valve-box shells and cylinder having ports governed by the piston of the tool whereby air under pressure acting on the larger head of the differential valve is permitted to escape to atmosphere when the piston of the tool is in its extreme rearward position, substantially as described.

6. A power-hammer consisting of a cylinder, a hammer or piston slidable within the cylinder, means for carrying a tool in the cylinder end, a handle secured to the cylinder, a valve-box in such handle, a slidable differential valve contained within such valve-box, said differential valve having heads of unequal areas and an annular groove, said handle having ports leading to each head of the differential valve, an air-compressor for producing two streams of compressed air, air-inlets for conducting the air under pressure from the air-compressor to ports in the handle, whereby, on a predetermined ratio of pressures being obtained within the tubes and valve-box, the differential valve is held in equilibrium, rings or shells arranged between the cylinder end and the valve-box, an annular distributing-valve arranged to slide between such shells said valve-box and shells having ports governed by the differential valve to actuate the annular distributing-valve in one direction when the equilibrium of the differential valve is destroyed on one impulse of the air-compressor, said shells, valve-box, distributing-valve and cylinder having ports governed by the distributing-valve when said distributing-valve is actuated in said direction whereby air under low pressure is conducted to the front of the piston of the tool to return the piston to its starting-point and the air behind the piston is permitted to exhaust, said valve-box and shells also having ports governed by the differential valve to actuate the distribution-valve in the reverse direction when the equilibrium of the differential valve is destroyed by the next impulse of the air-compressor, said shells, valve-box, distributing-valve and cylinder also having ports governed by the distribution-valve when actuated in the reverse direction whereby air under high pressure is conducted to the back of the piston of the tool to effect the blow-stroke and air in front of the piston is permitted to exhaust, means for cutting off the supply of air under high pressure behind the piston when it has completed a portion of its stroke, means for preventing air under low pressure from exceeding requirements and means for starting and stopping the tool, substantially as described.

In testimony whereof I have signed my name to this specification in the presence of two subscribing witnesses.

HARRY BENWELL STOCKS.

Witnesses:
JOSHUA ENTWISLE,
ALFRED YATES.